June 19, 1956

F. D. MARASSO 2,751,591

DOUGH PANNING MACHINE

Filed Jan. 25, 1951

Inventor.
Fred D. Marasso.
By Hier+Hier
Attys.

Inventor.
Fred D. Marasso.
By Hill & Hill
Attys.

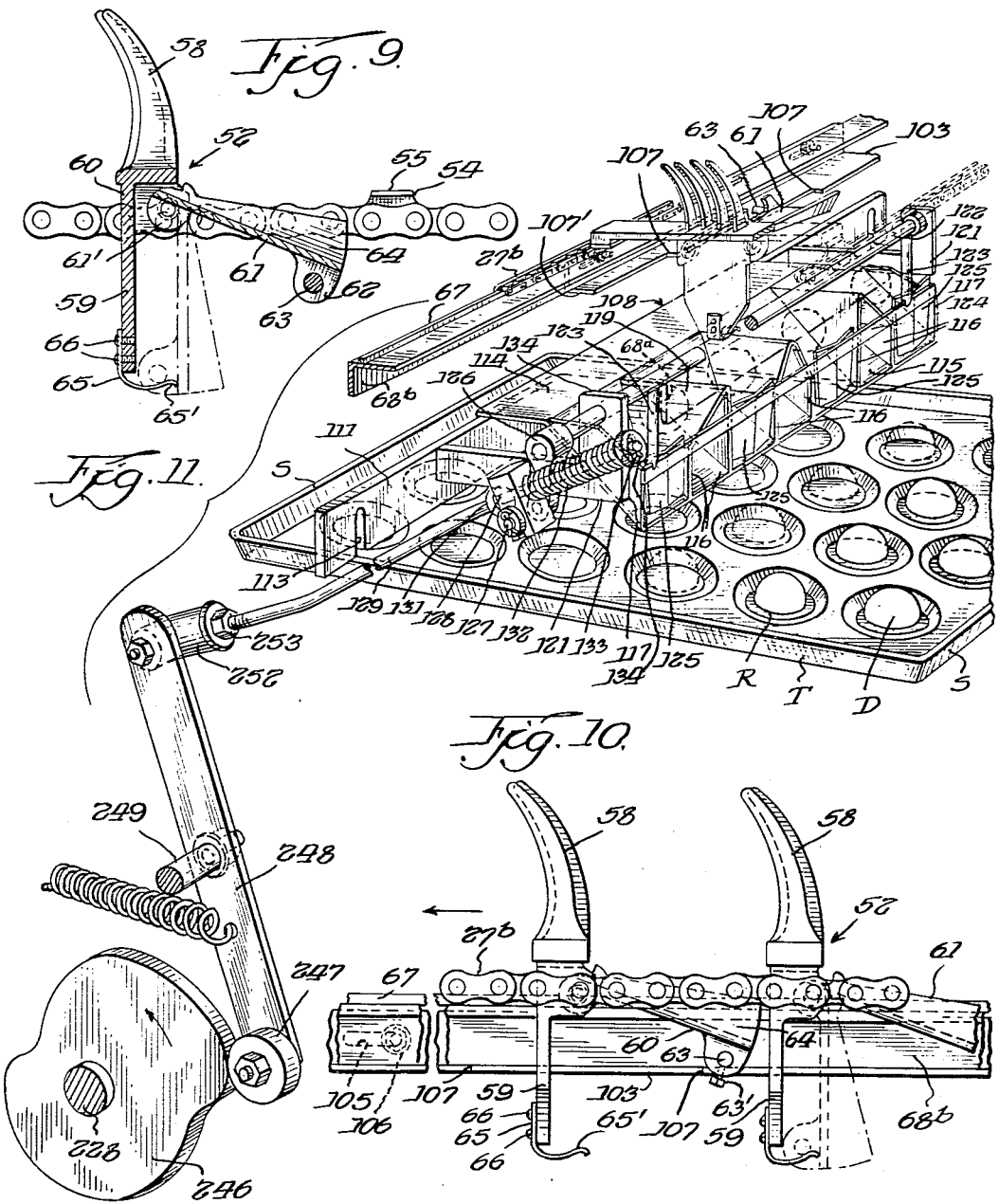

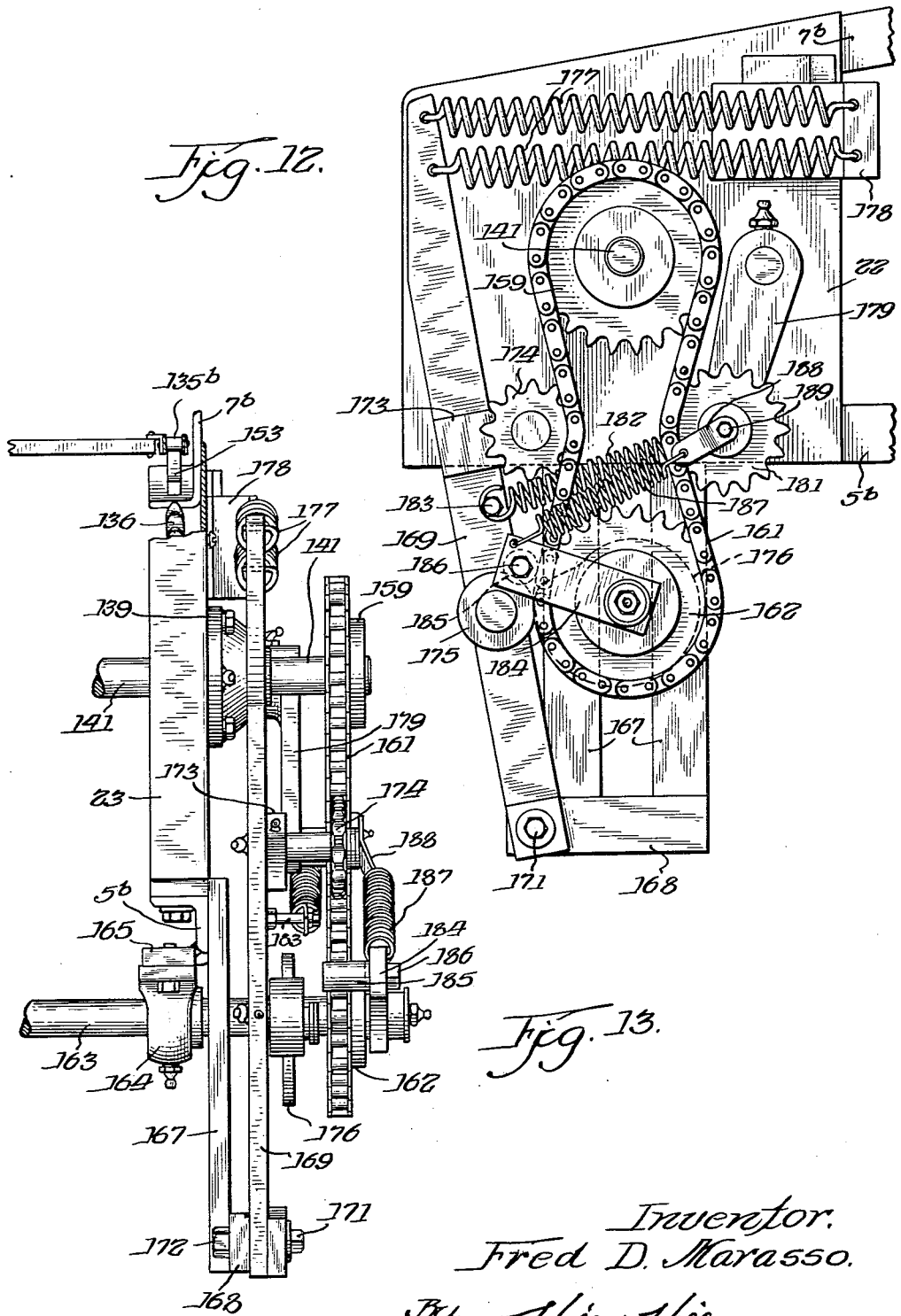

United States Patent Office 2,751,591
Patented June 19, 1956

2,751,591

DOUGH PANNING MACHINE

Fred D. Marasso, Joliet, Ill., assignor to Union Machinery Company, Joliet, Ill., a corporation of Illinois Application January 25, 1951, Serial No. 207,781

28 Claims. (Cl. 53—160)

The invention relates generally to loading or filling mechanisms, and more particularly to a device adapted to fill trays or pans with unbaked dough in connection with the production of buns and the like.

The invention is particularly adapted for use in connection with the baking of buns such as hamburger buns or the like in which twenty-four, more or less buns are placed in a single pan on which they are carried during the proofing and baking periods. Machines are available for automatically dividing a large volume of dough into small balls or lumps of the desired size to produce a bun, and in the past, the divided balls or lumps of dough have been manually placed on the trays prior to proofing and baking. As such dough dividers operate at relatively high speed delivering from one hundred to three hundred rounded lumps of dough per minute, at least three or four persons are required to handle the output of the machine.

The present invention therefore has among its objects the production of a machine which will automatically receive the lumps of dough from a dough dividing machine and fill trays therewith at speeds commensurate with the output of the dough divider, which machine requires a minimum of operating personnel.

Another object of the invention is the production of such a machine which is relatively simple in construction, durable and dependable, resulting in high efficiency at relatively high speed, and which may be readily operated by inexperienced personnel.

Another object of the invention is the production of such a machine having novel tray advancing means which is so designed that an operator may conveniently supply trays thereto and at the same time maintain an inspection of the operation of the machine to insure proper loading of the trays.

A further object of the invention is the production of a tray advancing mechanism including novel means for imparting an additional advance movement of the trays to properly position a succeeding tray after the preceding tray has been filled.

A further object of the invention is the production of such a machine having efficient dough transporting mechanism, together with novel means for releasing the dough onto the trays in proper synchronism to insure accurate positioning of the dough thereon.

A further object of the invention is the production of such a machine which is so designed that it may be readily and efficiently cleaned and thereby maintained in proper sanitary condition.

Many other objects and advantages of the construction herein shown and described will be obvious to those skilled in the art.

To this end my invention consists in the novel construction, arrangement and combination of parts herein shown and described, and more particularly pointed out in the claims.

In the drawings, wherein like reference characters indicate like or corresponding parts:

Fig. 8 is a view similar to Fig. 7 with the dough-carrying door in open or down position;

Fig. 9 is a sectional view through one of the dough-carrying members showing the details of the construction thereof;

Fig. 10 is a side elevational view of a portion of the dough conveyor prior to the release of the dough into the gate mechanism;

Fig. 11 is a perspective view of the mechanism for releasing the dough into the trays together with the actuating mechanism therefor;

Fig. 12 is a side elevational view of the tray advancing mechanism for imparting a variable feed to the trays; and Fig. 13 is an end elevational view of the mechanism illustrated in Fig. 12.

*General description of the machine*

Figure 1:
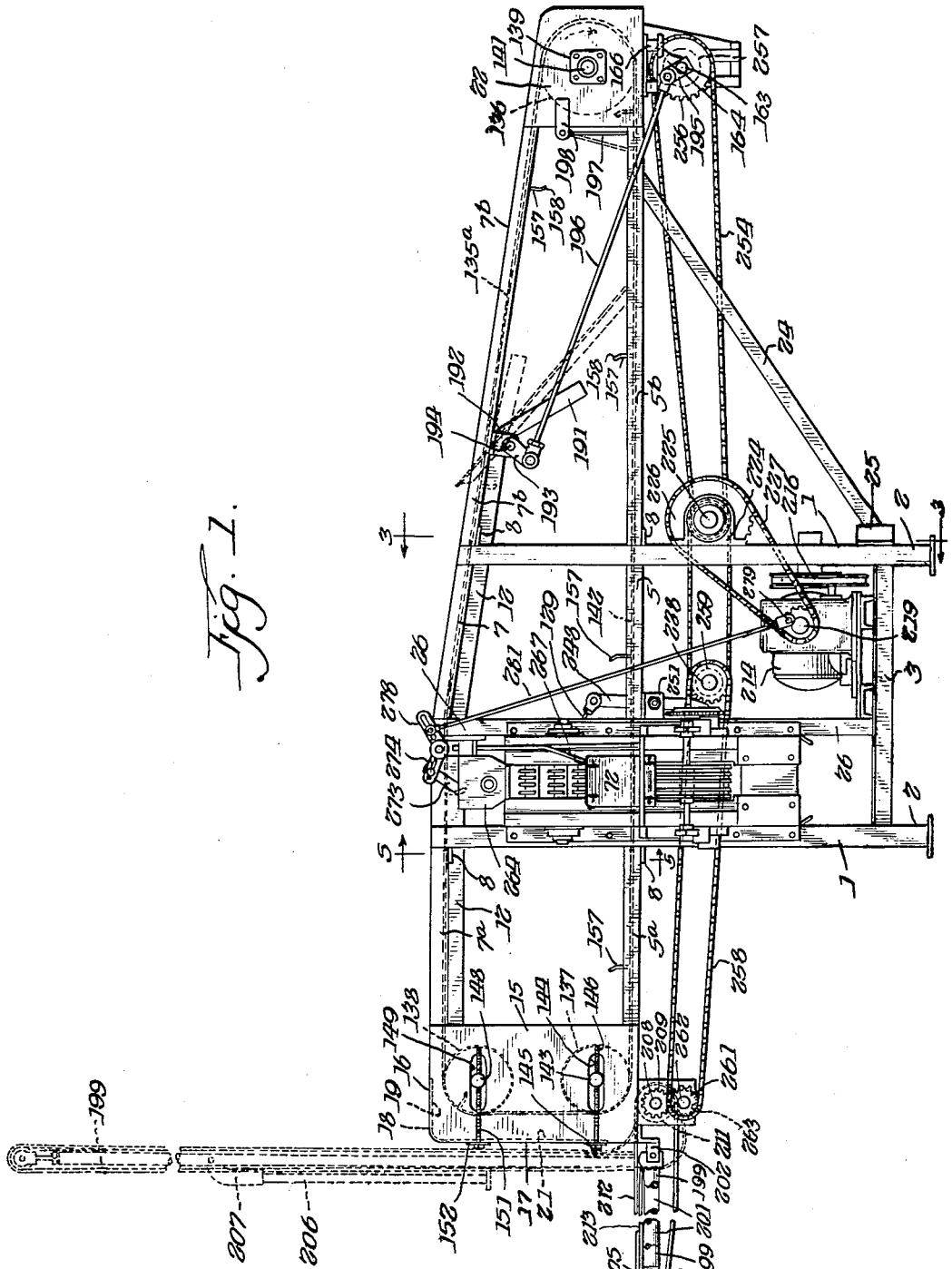
Fig. 1 is a front elevational view of a machine embodying the present invention.

The embodiment of the invention illustrated may, for the purpose of description, be divided into two interrelated and synchronized mechanisms, first, the conveying means for receiving and moving the pans or trays through the machine; and second, the dough transporting mechanism which receives the balls or lumps of dough and transports the same to the release mechanism, which at the proper time deposits the dough into the pans. The pans may be manually fed into the machine on a centrally positioned loading platform at the top of the machine from which the trays are moved rearwardly and dropped to a lower level at which level they will subsequently receive the lumps of dough. The pans then reverse their movement, moving back through the machine, during which movement the dough is deposited thereon, after which they are conveyed out of the opposite end of the machine.

The dough is picked up as it leaves the dough divider and is elevated by the transporting mechanism to a position above the pans moving through the machine on the lower level, with the dough passing below the pan loading platform, and moving in a direction transversely to the movement of the pans therebelow during this operation. The dough is deposited from the transporting mechanism into a gate or release structure which retains the balls of dough until the pan is properly positioned therebelow, at which point the dough is released and drops into the pan. In this operation, a full row of dough lumps is deposited on the pan, filling the same entirely thereacross. As the pans continuously advance, the succeeding row of lumps of dough are dropped into the gate structure, from which they are released at the proper time to deposit the next row of dough in the pan. In the embodiment of the invention illustrated, the conveying means for the pans or trays is in continuous operation so that such pans are continuously moving through the machine, and as the distance between successive rows of dough on a respective pan is normally less than the distance between the last row of one pan and the first row of the next pan, novel means is provided for automatically advancing the pans more rapidly as a succeeding pan is brought into position to receive the first row of lumps of dough thereon, whereby the dough transporting mechanism may be operated at a constant speed. As the entire operation of the machine is automatic, the only manual operations required are the supplying of the empty pans to the machine and the removal of the pans following their passage through the machine, so that the machine may be readily operated by two persons, one loading the pans into the machine and inspecting the operation thereof, and the other removing the loaded pans as they leave the machine. The description of the machine is broken down into headings which are as follows— first, the general frame structure of the machine; second, the dough transporting structure; third, the pan or tray conveyor structure; and fourth, the power connections for actuating the various moving elements of the machine.

*General frame structure*

Referring to Figs. 1 to 4, the frame structure in the embodiment of the invention illustrated includes four upright members 1 terminating at their lower ends in leg portions 2 forming the base support for the machine, the members 1 being formed of suitable material such as angle iron and connected by lower cross members 3 and 4 likewise formed from angle iron or other suitable stock. The members 1 are also connected by intermediate cross members 5 and 6 and upper cross members 7, likewise formed from angle iron or other suitable stock, and thus forming a rigid frame structure, the various elements of which are suitably secured together by welding, bolts or other satisfactory means.

As illustrated in Fig. 1, the members 5 are extended outwardly beyond the uprights 1 as indicated at 5a and 5b, and the upper members 7 are extended as indicated at 7a and 7b, and in the construction illustrated, the portions 5a and 5b, and 7a and 7b are formed from separate stock and secured to the respective members 5 and 7 by reinforcing plates 8. Extending between the members 5 throughout their length is a connecting wall or floor indicated generally by the numeral 9 formed from sheet metal or other suitable material, and in the embodiment of the invention illustrated is formed in a plurality of sections having downwardly extending abutting meeting flanges 11. In like manner, the members 7 are connected by a floor member indicated generally by the numeral 12 similarly formed from sheet metal and divided into a plurality of sections, each of which is provided with a downwardly extending flange 13 adapted to abut a similar flange on the next section. The floor 12, however, is provided with offset portions 14 at either side whereby the floor 12 is positioned below the members 7, with the portions 14 forming retaining walls for trays positioned on the floor.

The ends of the members 5a and 7a at each side of the machine are connected by plates 15, only one of which is illustrated in Fig. 1, the upper edges 16 and upper portion of the end edges 17 of which are formed with inturned flanges and the two plates 15 are connected by a cover plate 18 extending between the top edges 16 as indicated at 19 and along the edges 17 as indicated at 21, with the lower edge of cover 18 spaced above the members 5a to provide an outlet opening for the filled trays. The free ends of the members 5b and 7b likewise are connected by similar plates 22, the upper and end edges of which are provided with inwardly extending flanges 23. The last-mentioned portions of the machine may be further supported by a pair of brace members 24, only one of which is shown in Fig. 1, each brace member extending between a respective member 5a and the adjacent uprights 1, with the adjacent ends of the members 24 secured thereto by any suitable means, as for example, angle brackets 25. The various elements thus far described may be secured together by bolts and nuts, welding or other suitable means.

The frame structure is also provided with two intermediate uprights 26 secured to the cross members 3, 5 and 7 and similarly formed from suitable angle iron or the like, with the intermediate uprights 26 being aligned with the adjacent pairs of uprights 1. Thus, a relatively light but durable frame structure is provided.

*The dough transporting mechanism*

Figure 3:
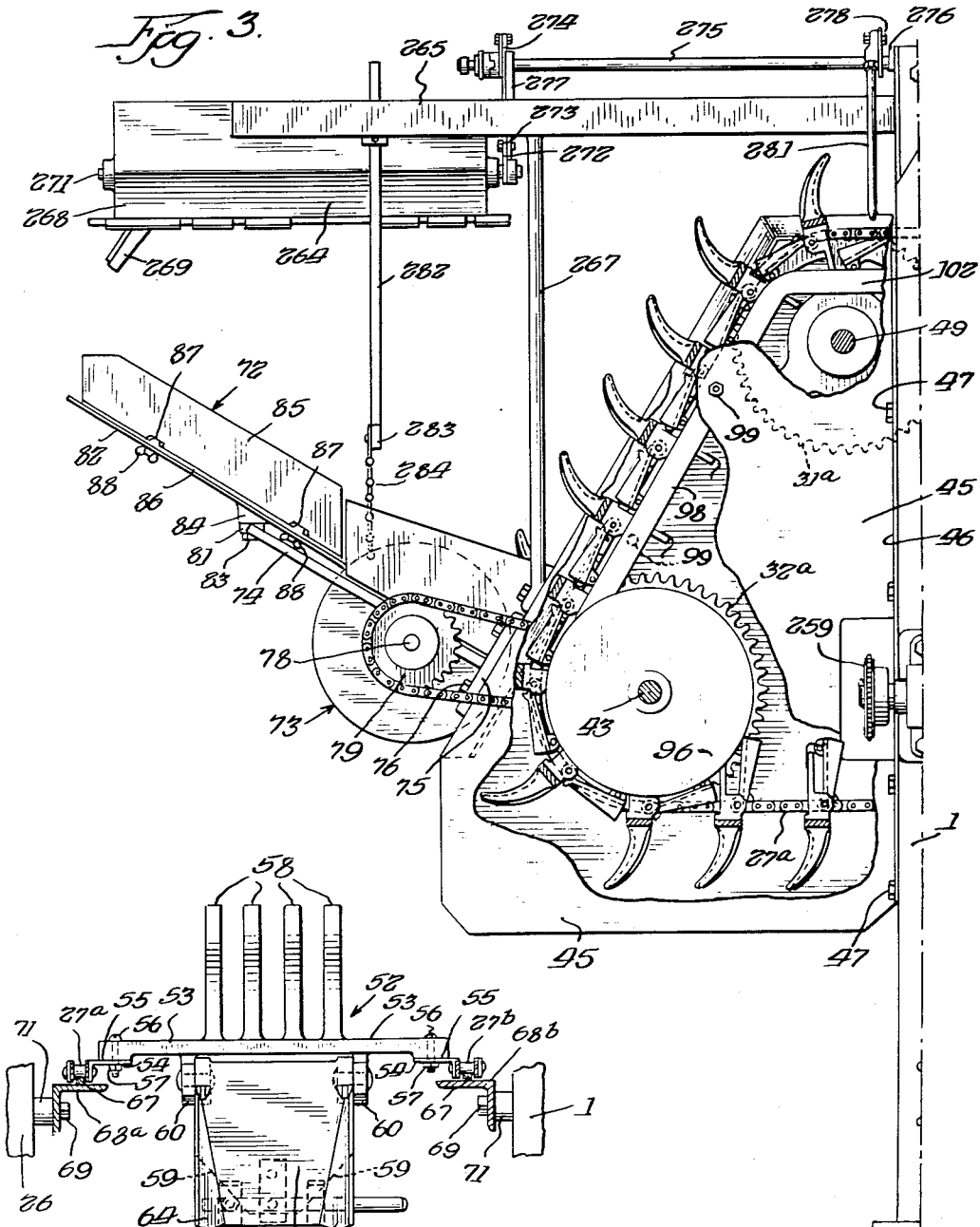
Figs. 3 and 4 are composite sectional views of the machine taken approximately on the line 3—3 of Fig. 1, wtih portions of the housing structure broken away to show the details of the dough conveying mechanism.
Figure 4:
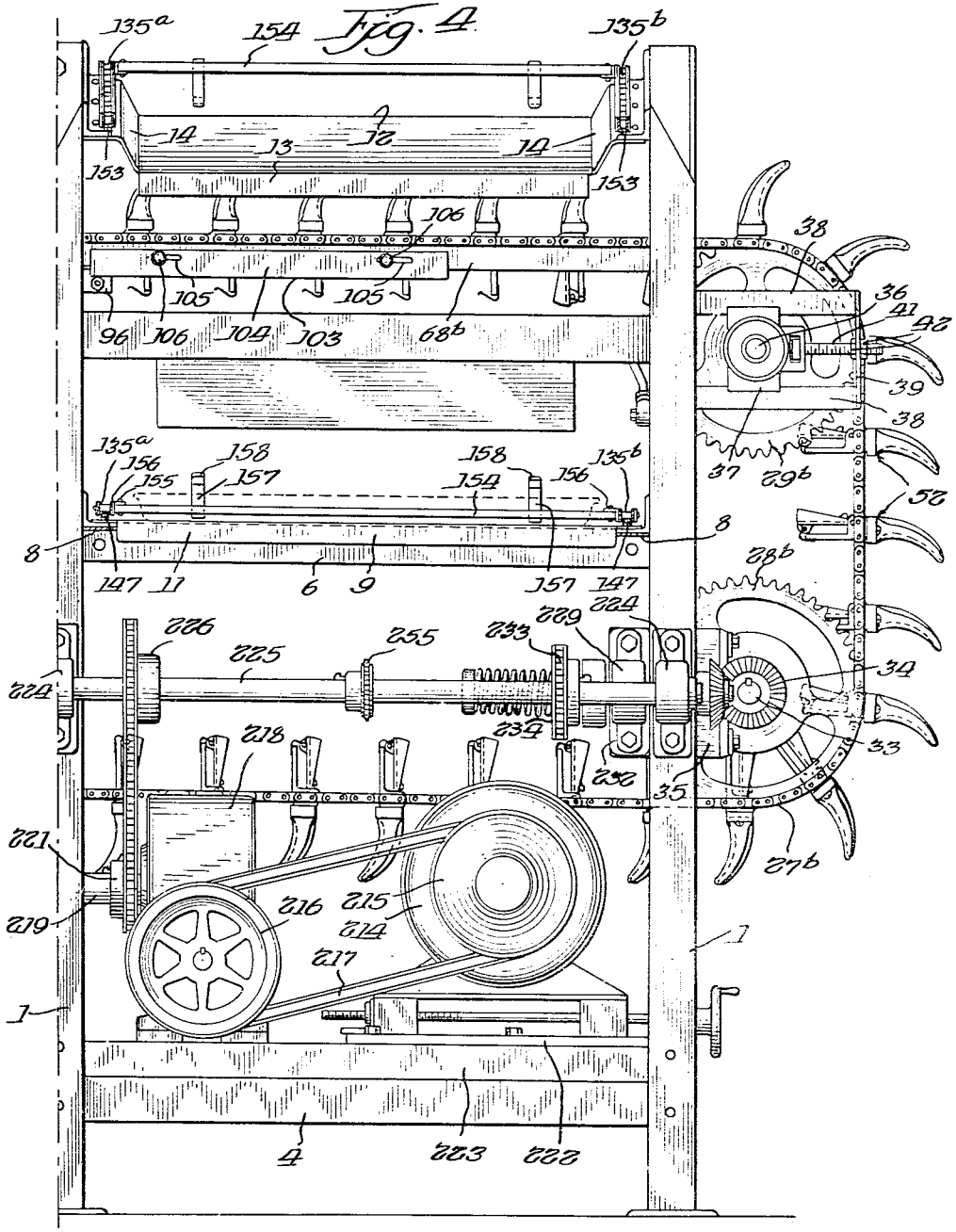
Figure 5:
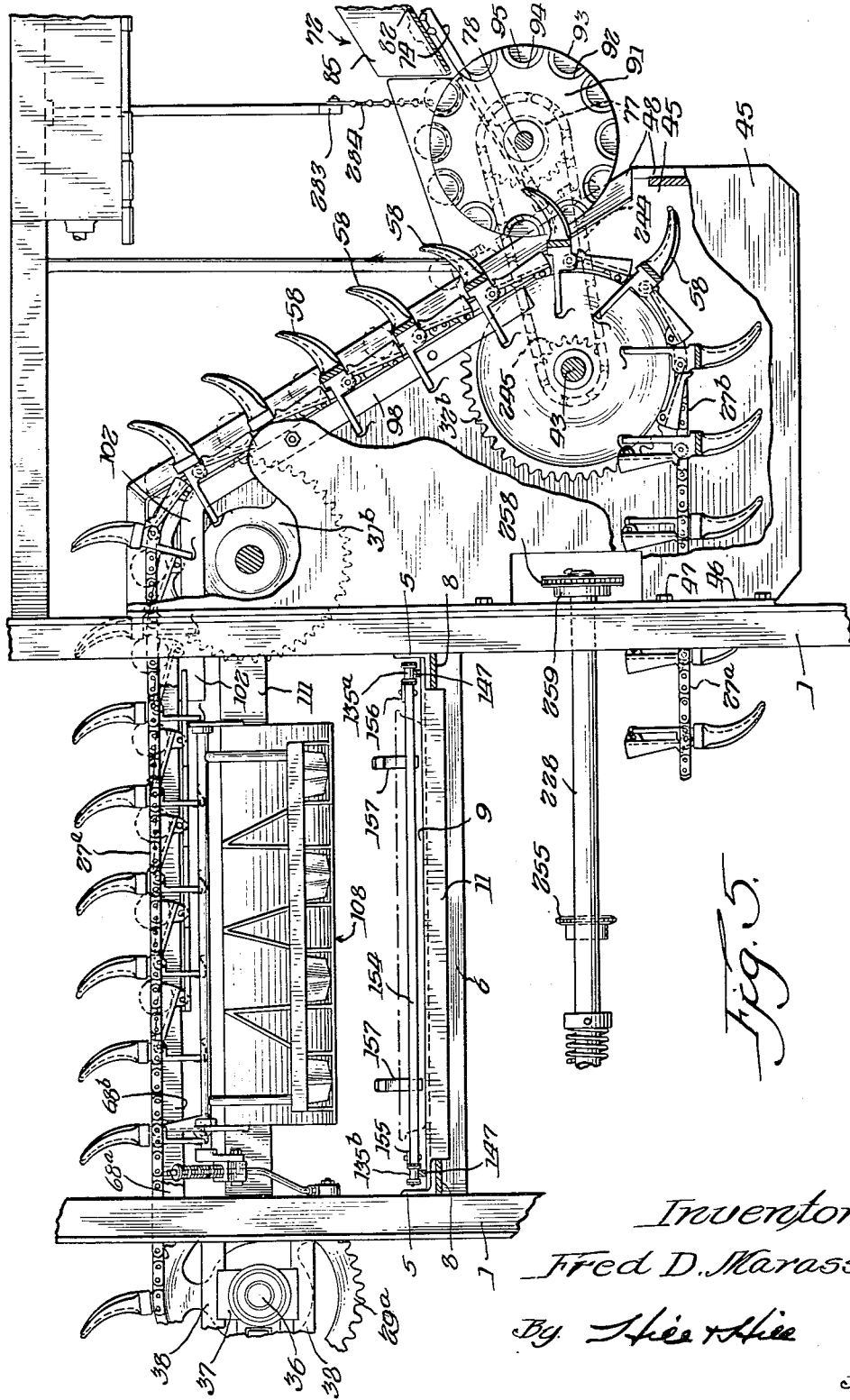
Fig. 5 is a fragmental sectional view taken approximately on the line 5—5 of Fig. 1 showing on an enlarged scale the details of the dough conveying mechanism.

The dough transporting structure includes a pair of endless chains 27a and 27b, each being carried by a plurality of sprockets, the sprockets 28a, 29a, 31a and 32a carrying chain 27a, and similar sprockets 28b, 29b, 31b and 32b carrying the chain 27b. Both of the sprockets 28a and 28b are rigidly mounted on a drive shaft 33 having a beveled driving gear 34 secured thereto, and form the driving sprockets for the chains 27a and 27b, with the shaft 33 being journaled in suitable bearing members 35, the bearing 35 adjacent the sprocket 34 being mounted on the adjacent upright 26, and the bearing adjacent the sprocket 28a being mounted on the adjacent upright 1. The sprockets 29a and 29b are likewise mounted on a shaft 36 journaled in respective bearings 37, each of the latter being slidably mounted on respective guides 38, the inner ends of which are rigidly secured to the respective adjacent uprights and the outer ends of which are connected by a plate 39. The bearings 37 may be locked in any adjusted position along the members 38 by means of a threaded stud 41 carried by each bearing and extending through the adjacent plate 39, with the studs locked in position by suitable nuts 42. Thus, by varying the position of the bearings 37, the tension on the chains 27a and 27b may be properly adjusted. The sprockets 32a and 32b are similarly supported by a shaft 43 journaled in bearings 44 mounted on respective plate members 45 which are generally triangular in shape as illustrated in Figs. 3 and 5, with each plate provided with a mounting flange 46 respectively secured to the front upright 1 and intermediate upright 26 by means of suitable bolts 47, the upper and front edge of each plate 45 being provided with inwardly extending flanges 48. In like manner, the sprockets 31a and 31b are mounted on a shaft 49 journaled in bearings 51 carried by the plates 45. Referring to Figs. 3 and 4, it will be apparent that the chains 27 each extend upwardly from the driving sprockets 28a and 28b over the respective sprockets 29, horizontally across the machine between the floors 9 and 12, around the sprockets 32, and horizontally back below the floor 9 to the sprockets 28.

Figure 7:
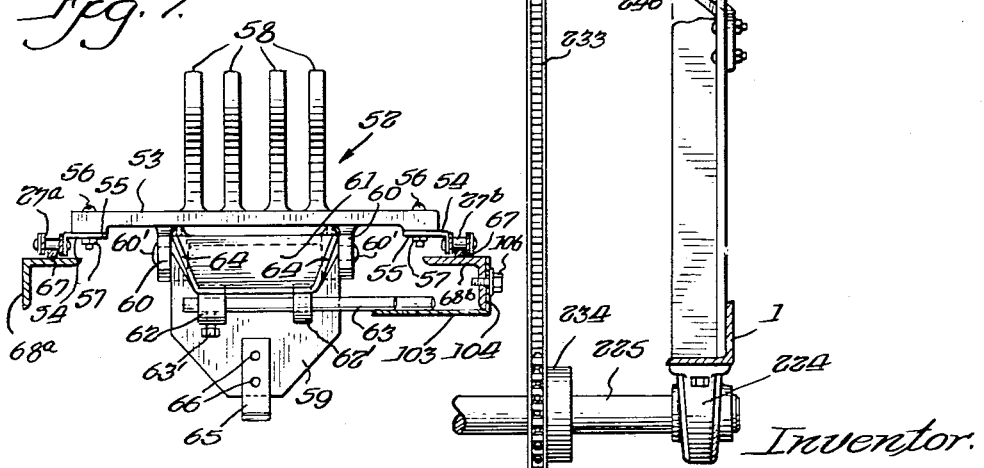
Fig. 7 is a sectional view of the dough conveying mechanism taken approximately on line 7—7 of Fig. 6 with the dough-carrying door in up position.

Extending between the chains 27a and 27b are a plurality of dough-carrying members indicated generally by the numeral 52 shown in detail in Figs. 7, 8, 9 and 10. Each of the members 52 is provided with a horizontally extending base portion 53, the opposite ends of which are positioned adjacent respective chains 27a and 27b and are secured thereto by brackets 54 illustrated in the present embodiment of the invention as each forming one of the side plates for the chain and having a horizontally extending portion 55 secured to the base portion 53 by screws 56 and nuts 57 whereby the members 52 are carried by and move with the respective chains. Extending outwardly from the base portion 53 or upwardly as viewed in Figs. 7 to 10, are a plurality of spaced curved fingers 58 which are curved forwardly in terms of direction of chain movement as viewed in Fig. 10. Extending inwardly and downwardly as viewed in Figs. 5, 7 and 10, is a plate-like extension 59, both the latter and the fingers 58 being rigidly secured to the base portion 53 and if desired these elements may be formed as a single-piece casting. Also carried by the base portion 53 and in the embodiment illustrated formed as an integral part thereof are a pair of spaced ears or lugs 60, the respective ears 60 carrying aligned pins 60' forming means for pivotally supporting a door member 61 therefor, each pin passing through a lug or ear 61' whereby each door is rotatable from a more or less horizontal position such as that illustrated in Figs. 9 and 10 to a more or less vertical position as illustrated in Fig. 5 and in dotted lines in Figs. 9 and 10. The outer portion of each door is also provided with a pair of lugs 62 and 62' in which is slidably mounted a pin 63, the latter being held in any desired position of adjustment as hereafter described by a lock screw 63' threaded into the lug 62. As illustrated in Figs. 5a, 7 and 9, each door 61 is provided with retaining walls 64 to prevent dough placed on the door from moving laterally into engagement with the chains when the door is in its up or horizontal position. Extending outwardly from the extension 53' is a generally U-shaped spring member 65, having a laterally ending portion 65' adapted to engage the pin 63 carried by the door when the latter is in a down position, as illustrated in dotted lines in Figs. 9 and 10, whereby the door is retained in such position until subsequently mechanically moved into its closed or up position. The spring 65 may be secured to the door 61 by any suitable means as for example, screws 66.

Figure 2:
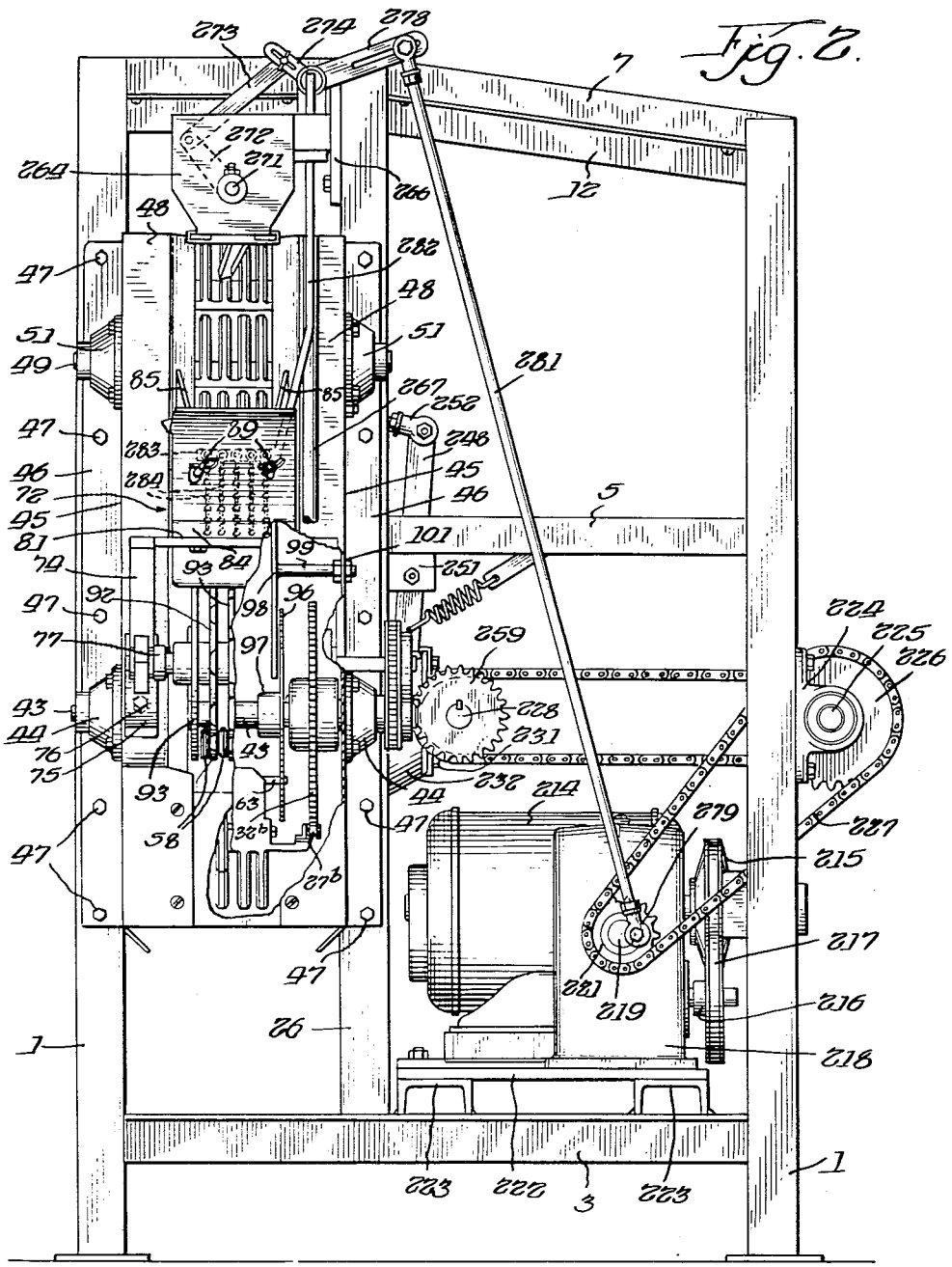
Fig. 2 is a similar view of just the central dough conveying portion of the machine on a larger scale than that illustrated in Fig. 1.

The chains 27a and 27b throughout their straight travel from the sprockets 31a and 31b to the sprockets 29a and 29b ride on rails 67 carried by cross members 68a and 68b secured at their respective ends to the uprights 1 and 6, the members 68, in the embodiment of the invention illustrated, being formed from angle iron and secured to the uprights by any suitable means, such as bolts 69, with the members 68 being spaced inwardly from the uprights by spacer members 71. The balls or lumps of dough are fed or loaded into the chain conveyor by means of a chute, indicated generally by the numeral 72, and a rotary dough distributing drum, indicated generally by the numeral 73, the details of this structure being illustrated principally in Figs. 2, 3 and 5. Secured to the flange 48 of the plate 45 are respective angularly extending frame members 74, the inner ends of which are each secured to a respective base plate 75 secured to the flanges 48 by screws 76, or other suitable means. Each of the frame members 74 has secured thereto a bearing 77 in which is journaled a shaft 78, upon which is rigidly mounted the distributing drum structure 73. Also secured to the shaft 78 is a driving sprocket 79 by means of which the drum 73 is rotated. The frame members 74 are connected at their outer ends by cross member 81, on which is mounted a base plate 82, the latter being secured to the cross member 81 by bolts 83 extending into the transverse projection 84 carried by the plate 82, which forms the bottom of the chute structure 72, the latter being completed by a pair of outwardly flaring side plates 85 terminating at their lower edges in outwardly extending flanges 86, with the side walls 85 being secured to the bottom plate 82 by studs 87 carried by the flanges 86 and wing nuts 88, with the studs extending through slots 89 in the base plate, as illustrated in Fig. 2, thereby providing lateral adjustment of the side walls relative to the base plate.

The drum structure 73 is similar in general structure to that illustrated in my prior Patent 2,064,437 dated December 15, 1936 for a Loading Device for Proofers, and comprises a series of spaced discs 91, 92 and 93, the embodiment of the invention illustrated utilizing five such discs, the two outer discs 93 being circular in shape, and the two intermediate discs 91 and center disc 92 having a series of semi-circular recesses 94 and 95 respectively cut in the periphery thereof. As clearly illustrated in Fig. 5, the recesses 94 in the center disc 91 are larger than the recesses 95 of each of the intermediate discs 92 so that, when assembled, the recesses 94 and 95, in effect, form a series of semi-spherical pockets in the periphery of the drum structure of a size to accommodate the balls or lumps of dough to be loaded. The spaces between the respective discs are of a size to permit the respective fingers 58 of each of the dough-carrying members 52 to pass between the peripheral portions of the plates, as clearly illustrated in Fig. 5. Thus, as a lump of dough is deposited into the chute 72, it will roll down into one of the pockets formed in the drum 73 and, as the latter is rotated in a counter-clockwise direction, as viewed in Fig. 5, the dough is transported to a position where it may be removed from the pocket by the fingers 58 of one of the dough-carrying members 52 as the latter moves upwardly in a counter-clockwise direction, as viewed in Fig. 5, with the means for driving the drum 73, and the chains 27a and 27b being so designed that the movement of the members 52 and the drum 73 are properly synchronized.

Also carried by the shaft 43 is a disc 96, the latter being mounted on a hub 97 which is secured to the shaft 43. The disc 96 is of such a size that the peripheral edge thereof will engage the pins 63 carried by each door 61 of the respective members 52 as the latter start to pass around the sprockets 32a and 32b, camming the doors into their closed, or more or less horizontal position, as clearly illustrated in Fig. 3, whereby the doors cooperate with the fingers 58 to support the dough while being transported. Cooperating with the disc 96 is a guide bar 98 which is supported by studs 99 secured thereto and extending through the adjacent plate 45 and secured in proper position by lock nuts 101, the bar 98 extending upwardly and terminating at its upper end in a horizontally extending portion 102.

Figure 6:
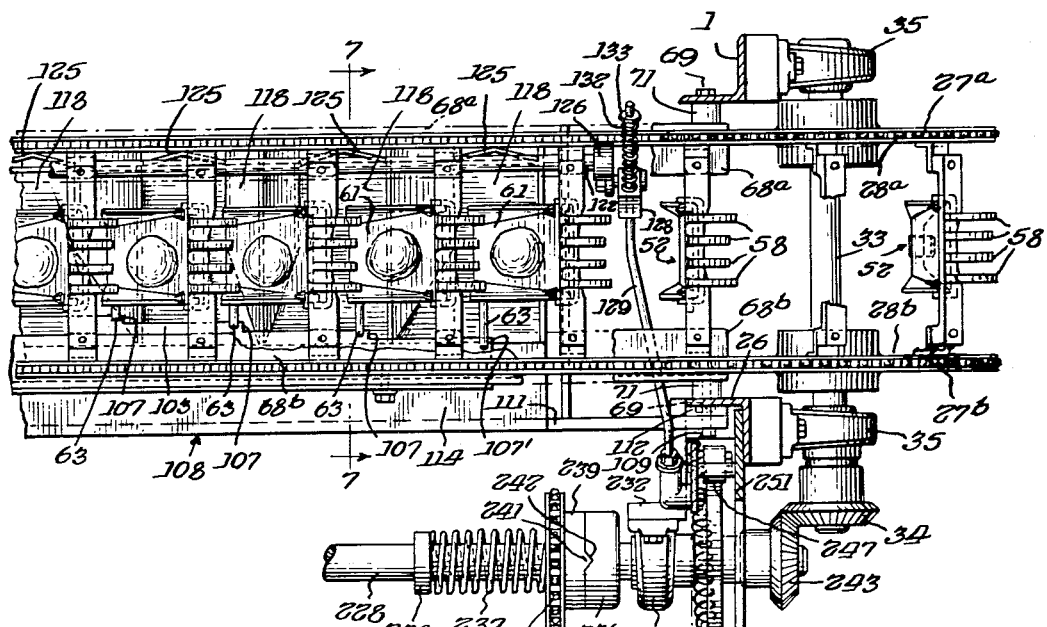
Fig. 6 is a fragmentary top plan view of the dough conveying and release mechanism and driving means associated therewith.

The bar 98 functions to maintain the doors 61 in closed position following the engagement of the pins 63 with the disc 96. As the pins leave the upper end of the bar 98, they are engaged with a horizontally extending plate 103, which likewise initially maintains the doors in closed position. The plate 103 is provided with an upwardly extending flange 104 having horizontally extending slots 105 therein through which extend bolts 106 threaded into the angle member 68b, so that by loosening the bolts 106, the plate member 103 may be longitudinally adjusted, following which it may be locked in position by retightening the bolts 106. As illustrated in Fig. 11, the plate 103 is provided with a series of stepped portions 107, the last of which is formed by the free end 107' of the plate, with the number of stepped portions corresponding to the number of lumps of dough to be deposited simultaneously into a pan or tray, four lumps being simultaneously deposited in the embodiment of the invention illustrated. The pins 63 are arranged in staggered relation, as shown in Fig. 6, in a series corresponding to the number of lumps to be dropped, in the present instance 4, and the pins of each series are set, as illustrated in Fig. 6, so that the doors of each series are maintained in closed position until the pins reach the end of their respective offsets and the end of the plate, whereby all of the pins of a series will be simultaneously disengaged from the plate, permitting the four doors of such series to simultaneously move downward, dropping the four lumps of dough carried thereby.

Mounted below the cross members 68 and adapted to receive the lumps of dough as they are dropped from the members 52 is a gate structure, particularly illustrated in Figs. 4, 5, 6 and 11. The gate structure 108, as illustrated in Figs. 6 and 11, is supported by the uprights 26 by means of bolts 109 passing through the supporting bar or plate 111 of the gate structure, and spacing members 112 which are secured to the adjacent wall of the uprights 26, the member 111 being preferably provided with slots 113 whereby the gate structure may be readily disconnected from the machine without removal of the bolts 109, facilitating cleaning, etc., of the gate structure. Extending forwardly from the supporting plate 111 is a base or bottom plate 114, the bottom portion of which is inclined, as indicated at 115, with the latter being divided into a plurality of compartments or receptacles by partition walls 116 and end walls 117 to form spaced compartments 118. The adjacent upper portions of the partitions 116 extend angularly relative to one another, whereby the junctures 119 of such portions define the respective compartments and, in effect, provide compartments 118 having outwardly flaring upper portions of greater area than the lower portions thereof, whereby dough dropped from the carriers 52 will be directed to and readily drop down into the lower portions of the respective compartments. The base 114, partition walls 116, and end walls 117 may be suitably constructed of sheet metal, and the elements securely fastened together by any suitable means, as for example, welding, bonding or the like.

Also carried by the supporting plate 111 is a pair of L-shaped brackets or arms 121 in which is pivotally mounted a rock shaft 122, the latter having a pair of downwardly extending extensions 123 which are connected by a cross bar 124. Suitably mounted on the cross bar 124, and movable therewith, are a plurality of gates 125 spaced along the cross bar 124, and positioned to close the front or open side of each compartment 118. Thus, by partially rotating the rock shaft 122, the gates 125 may be positioned as illustrated in Fig. 11, closing the respective compartments, and retaining any lumps of dough therein. However, by rotating the shaft 122 counter-clockwise, as viewed in Fig. 11, the gates 125 may be swung out of closed position, permitting the lumps of dough in the compartments 118 to slide or roll along the inclined portion 115 of the bottom plate from the compartments, and drop into a pan positioned therebelow. The rock shaft 122 is actuated through a rocker arm 126 rigidly connected to the shaft and having a pin 127 extending from the outer end thereof, the latter extending through a block 128 slidably mounted on an actuating cross link 129. Rigidly mounted on the link 129 is a sleeve or collar 131 adapted to bear against the block 128 as the link 129 is reciprocated in a direction to open the gates 125, and mounted on the free end of the link 129 is a compression spring 132 which bears at one end against the block 128, thus urging the same in a direction to engage the collar 131, and at its outer end against a washer 133, the latter being held on the link 129 by suitable means, as for example, a cotter key 134, or the like. Thus, as the link 129 is reciprocated, the collar 131 will engage the block 128 to rotate the rocker arm 126 and the shaft 122 in a direction to open the gates, and on the return movement of the link 129, the gates will close to the position illustrated in Fig. 11, at which point the cross bar 124 engages the front edges of the walls 116 and 117, forming stops, with any additional return movement of the link 129 being absorbed by the compression spring 132.

*The pan conveyor mechanism*

The pan conveyor mechanism is generally illustrated in Figs. 1, 4, 5, 12 and 13, and includes a pair of endless chains 135a and 135b, each of which pass around three respective sprockets 136, 137, and 138. Mounted on each of the plates 22 is a bearing 139, in which is journaled a drive shaft 141, with each sprocket 136 for the respective chains 135a and 135b being rigidly carried by the shaft 141, with the direction of rotation of the shaft being clockwise as viewed in Fig. 1. The respective chains extend from the lower portions of the sprockets 136 horizontally, as indicated at 142, to each respective sprocket 137, which are suitably rotatably mounted on a shaft 143, the latter extending through respective horizontally extending slots 144 in the plates 15, whereby the shaft 143 may be horizontally adjusted in the slots. Extending outwardly from each of the plates 15 is an apertured plate 145 through which extends a threaded bolt 146 which is threaded through the shaft 143. Thus by turning the respective bolts 146, the shaft 143 may be horizontally adjusted. The portions of the chains extending between their respective sprockets 136 and 137, as illustrated in Figs. 4 and 5, ride on rails 147 suitably mounted on the floor member 9 and frame members 5, with the rollers of the chains 135a and 135b engaging their respective rails.

After passing around the sprockets 137, the respective chains extend upwardly and around respective sprockets 138, which are rotatably mounted on a shaft 148 mounted in a manner similar to the shaft 143 in horizontally extending slots 149 in the plates 15 and adjustably held in the desired position by bolts 151, similar to bolts 146, and likewise passing through respective plates 152 rigidly mounted on the plates 15. After passing around the sprockets 138, the chain extends through suitable openings in the frame members and horizontally along the latter and thence downwardly to the sprockets 136, with the portions of the respective chains intermediate their sprockets 138 and 136 riding on rails 153, similar to the rails 147, with the rails 153 being suitably mounted on the frame members 7 by welding, or other suitable means.

Extending transversely between the chains 135a and 135b at spaced, aligned intervals corresponding approximately to the length of the pans or trays employed are a plurality of conveyor bars 154, the latter being connected at their ends to the chains in a manner similar to the connection of the carriers 52 to the chains 27a and 27b, with each bar 154 being secured by screws 155, or other suitable means, to an angle side plate 156 on the chains. In the embodiment of the invention illustrated, each of the bars 154 is provided with a pair of tray-engaging projections 157 rigidly secured thereto, with the free ends of each projection extending angularly, as indicated at 158, with respect to the body thereof. It will be noted from a reference to Figs. 1 and 4 that the tray-engaging projections 157 extend inwardly with respect to the perimeter of the respective chains, so that the projections carried by the lower or bottom, horizontal portions of the chains extend upwardly, and those carried by the upper portions of the chains extend downwardly.

Referring to Fig. 11, which illustrates one of the usual type pans or trays employed in a machine of this type, it will be noted that the tray T is provided with a plurality of transverse rows or recesses R, each adapted to receive and retain a ball or lump of dough D, with the transverse rows, each of which is to be simultaneously filled or loaded with lumps of dough uniformly spaced on the pan. It will be apparent, however, that as the end rows of the tray are spaced approximately a comparable distance from the rim or side wall S of the tray, and as each tray is moved through the machine by the bars 154 and projections 157 which are positioned between the respective trays, the distance from the center of the last row of recesses R in the leading pan will be spaced a greater distance from the center of the first row of the following pan than the distance between centers of adjacent rows on the same pan. Means is therefore provided to synchronize the operation of the pan conveyor structure with the dough transporting mechanism to compensate for this additional distance between the last row of one pan and the first row of the next pan, and as dough dividing machines, which may be employed to supply the lumps of dough to the present machine, normally operate at uniform speeds, I prefer to vary the speed of the pan conveyor while operating the dough transporting mechanism at a uniform speed. The means for periodically accelerating the movement of the pans to bring the first row of the next pan into proper position with respect to the dough transporting mechanism is illustrated in Figs. 12 and 13. The shaft 141 carrying driving sprockets 136 for the chains 135a and 135b is provided with a sprocket 159 rigidly mounted on shaft 141 and connected by a chain 161 to driving sprocket 162 mounted on a drive shaft 163. The shaft 163 is journaled in a pair of bearings 164, each carried by the members 5b, with the bearing 164 adjacent the sprocket 162 being suitably connected by an extension member 165 secured by welding, or the like, to the adjacent frame member 5. The opposite bearing 164 is secured, as illustrated in Fig. 1, to the adjacent portion 5b of the frame member 5 by suitable bolts, the bearing being spaced from the frame member by spacing sleeves 166 to properly align the shaft 163.

Extending downwardly from the portion 5b of the frame member 5 adjacent the sprocket 162 is a pair of supplementary frame members 167 connected at their lower ends by a cross member 168, members 167 and 168 being secured together and to the frame by welding, or other suitable means. Pivotally mounted at its lower end to the lower end of the supplementary frame comprising the members 167 and 168 is an arm 169, the latter, in the embodiment illustrated, being pivotally connected to the frame by a shouldered bolt 171 and nut 172. The arm 169 is provided with a lateral extension 173 on which is pivotally mounted an idler sprocket 174, the latter being aligned with and engageable with the chain 161, and also rotatably carried by the arm 169 is a cam roller 175 which is engageable with a cam 176 carried by the shaft 163, the roller 175 and arm 169 being urged toward the cam 176 by a pair of tension springs 177 operatively secured at one of their corresponding ends to the arm 169, and secured at their opposite ends to a stationary bracket 178, which, in turn, is welded or otherwise secured, to the plate 22.

Pivotally mounted on the plate 22 is an idler sprocket arm 179 having rotatably mounted at its lower end an idler sprocket 181 aligned and engageable with the adjacent portion of the chain 161. The arm 179 and sprocket 181 are urged toward the chain 161 by a tension spring 182 secured at one end by a stud 183 to the arm 169, and at its opposite end to the lower end of the idler sprocket arm 179 by any suitable means (not shown). Carried by the shaft 163 and freely rotatable about the axis of the latter is a chain guide arm 184, the free or outer end of which is provided with a chain engaging member or roller 185 which limits rotation of the arm 184 toward the idler sprocket 181. In the embodiment of the invention illustrated, the member 185 is carried by the arm 184 through a bolt or screw 186. The roller 185 and arm 184 are urged toward the chain 161 by a tension spring 187 secured at one end to the outer end of the arm 184, and at its opposite end to the arm 179 by a link 188 secured to the arm 179 by a bolt 189. Thus, the chain is maintained at all times in proper engagement with the sprocket 162.

It will be apparent from the above, and reference to Fig. 12 of the drawings, that the idler sprocket 181 will tend to urge the adjacent portions of the chain 161 inwardly, as illustrated, the chain being of a length to provide a considerable amount of slack therein. Likewise, the idler sprocket 174 is normally urged into engagement with the opposite portion of the chain 161 by the springs 177, this action, however, being restricted by the cam 176 engaged with the roller 175 on the arm 169. Assuming that the shaft 163 and sprocket 162 carried thereby are rotating in a counterclockwise direction, as viewed in Fig. 12, the sprocket 159 and shaft 141 will likewise be rotated in a counter-clockwise direction, and as the shaft 163 rotates, carrying with it the cam 176, the arm 169 will move outwardly or to the left, as viewed in Fig. 12, counter to the forces applied by the tension springs 177, as a result of which the slack in the chain 161 is being reduced adjacent the sprocket 174, and the slack in the chain adjacent the sprocket 181 is being increased due to the action of the spring 182. The rise of the cam surface from its lowest portion to the highest portion is preferably such that the slack reduction in the chain adjacent the sprocket 174, and the increase in slack adjacent the sprocket 181 is substantially uniform throughout engagement of the roller 175 with such portion of the cam, whereby the rotation of the shaft 141, and thus the movement of the chains 135a and 135b is substantially linear. Such substantially uniform rotation of the shaft 141 thus continues until the roller 175 reaches the highest point on the cam 176, and as the drop-off from such high portion of the cam is very short, as soon as the roller reaches such drop-off portion, the arm 169 will begin to rapidly move toward the chain 161 under the action of the relatively heavy tension springs 177, which are considerably stronger than the spring 182, thus taking up substantially all of the slack in the chain 161 adjacent the sprocket 174. This rapid take-up of the slack in the chain will result in an additional rotation of the sprocket 159 and shaft 141, supplementing the substantially linear rotation resulting from the driving force exerted by the sprocket 162. The cycle will then be repeated.

The specific shape of the cam 176 will, of course, be determined in part by the number of rows on each pan, and the increment of travel which must be imparted to the tray to compensate for the added distance between the last row of one tray and the first row of the next.

In use, the trays are initially loaded into the machine by placing them successively on the upper floor 12 thereof adjacent the horizontal portions 7a of the frame members 7, where they will be engaged by a pair of projections 157 carried by one of the bars 154, which will push the tray to the right, as viewed in Fig. 1, down the inclined portion of the floor, from which they are to be subsequently dropped to the floor 9 and re-engaged by a subsequent pair of projections 57, which will then move the tray along the floor 9 toward the left, as viewed in Fig. 1. To insure proper synchronization, the dropping of the tray from the upper level to the lower, the right hand end of the floor 9 is preferably provided with a movable extension or section 191 which, in the embodiment of the invention illustrated, is pivotally carried by the member 7b of the frame by means of brackets 192 secured to the latter. The section 191 is controlled by a rocker arm 193 rigidly secured to the shaft 194 which carries the section 191, the arm 193 being, in turn, connected to an eccentric 195 rigidly secured to the shaft 163 by a connecting rod 196, thus reciprocating the section 191 from the open position illustrated in Fig. 1 to a closed position illustrated in dotted lines in such figure. It will be apparent that when the section 191 is in its upper or closed position, a tray moving down the inclined portion of the floor 12 would continue across the section 191 until its center of gravity had reached the end edge of the section. However, before this action can take place, the section 191 may be moved to the position illustrated in Fig. 1, thereby allowing the forward end of the tray to drop down into engagement with the floor 9, continued movement resulting in the tray dropping into a horizontal position, and as the tray during such movement has a horizontal momentum, it will normally slide toward the plates 22. To limit such movement, a pivoted stop member or plate 197 is provided, the latter being pivotally connected adjacent its upper edge by means of brackets 198 to the plates 22. The member 197 is free to rotate outwardly from the plates 22, as indicated in dotted lines, but is prevented by suitable means from rotating in the opposite direction, whereby further movement of the trays engaging the member 197 is prevented. The member 197 may be provided with suitable cut-out portions, or the like, providing free passage of the projections 157 through the member. The movement of the section 191 is suitably synchronized with the positions of the bars 154 so that the tray or pan will be dropped to the lower level at the proper time to position the tray between two of the bars 154 and the projections 157.

The machine is also provided with a secondary conveyor for the trays or pans adapted to convey the loaded pans from the machine after the chain conveyor has completed its transportation of the pans to adjacent the sprockets 137. This secondary conveyor is of the continuous belt type, and comprises a pair of parallel, tubular frame members 199 and 201 pivoted at one of their corresponding ends to the frame structure of the machine by brackets 202, whereby the members 199 and 201 may be rotated from a horizontal position, such as that illustrated in solid lines in Fig. 1, to a vertical position, such as that illustrated in dotted lines, the latter position being for the purpose of storage, and to reduce the space occupied by the machine when not in use. The frame members 199 and 201 are connected at their outer ends by a rotatable roller 203 journaled on respective bearings 204 adjustably mounted on the ends of the respective frame members, and held in position by lock nuts 205. The frame members may be supported in the horizontal position by a leg member 206, indicated in dotted lines, which is connected to the respective frame members 199 and 201 by a U-shaped yoke 207, the latter being pivotally connected to the respective frame members so that it may be rotated into either the position illustrated in dotted lines, or in a vertical position at right angles to the frame members when the latter are in a horizontal position.

Carried by the frame of the machine adjacent the free ends of the frame members 5a is a rotatable shaft 208 journaled in suitable bearings mounted on the frame structure, the shaft 208 having a driving gear 209, and a roller 211 mounted thereon. The conveyor belt 212 extends around the rollers 203 and 211, rotation of the latter resulting in movement of the belt. The upper portion of the belt intermediate the rolls 203 and 211 may be supported by suitable means, as for example, a bed surface 213 formed from one or more pieces of sheet material secured to the frame members 199 and 201 by any suitable means, and forming a supporting surface over which the belt 212 may slide. Thus, as the trays are discharged from the machine adjacent the sprockets 137, the trays are picked up by the belt 212, and transported out of the machine to a convenient point for the manual removal thereof.

The power and driving means

The various conveyor and transporting mechanisms are driven from a common source of power; namely, an electric motor 214, or other suitable means, the motor 214, in the embodiment of the invention illustrated, being connected by pulleys 215, 216 and belt 217 to a reduction gear box 218, the latter having an output driving shaft 219 carrying a driving sprocket 221. The motor 214 and gear box 218 are suitably mounted on a base member 222 supported by channel irons 223 extending between and rigidly secured to the cross members 3 by welding, or other suitable means. Journaled in suitable bearings 224 mounted on the right hand uprights 1, as viewed in Figs. 1 and 2, is a counter-shaft 225 on which is carried a driven sprocket 226 aligned with the driving sprocket 221 on the gear box 218, and connected by a chain 227.

The shaft 33 is operatively connected through the bevel gear 34 to the counter-shaft 225 by an intermediate shaft 228, the latter being journaled in bearings 229 and 231 mounted on the respective intermediate uprights 26, connecting members or blocks 232 rigidly connecting the bearings 229 and 231 to the respective uprights. The shaft 228 is operatively connected to the countershaft 225 by a chain 233 engaged with the driving sprocket 234 rigidly carried by the shaft 225, and engaged with the driven sprocket 235 carried by the shaft 228. The sprocket 235 is operatively connected to the shaft 228 through a spring actuated safety clutch comprising a collar 236 rigidly secured to the shaft 228, and a compression spring 237 engaged at one end with the sprocket 235, and at the opposite end with a collar 238 fixed to the shaft 228, whereby the spring 237 will urge the hub 239 of the sprocket 235 into engagement with the collar 236. As clearly illustrated in Fig. 6, the hub 239 and collar 236 are provided with interlocking portions consisting of a triangularly shaped projection 241 adapted to seat in a complementary V-shaped recess 242 in the collar 236. This clutch structure is disclosed in my prior Patent No. 1,922,856, issued August 15, 1933, and forms no part of the present invention. It will be apparent that as the sprocket 235 is maintained in engagement with the collar 236 by the action of the compression spring 237, if for any reason the shaft 228 should be stalled or subject to undue stresses, the torque on the sprocket 235 will overcome the action of the spring 237, withdrawing the projections 241 from the recesses 242, and thereby disengaging the power from the shaft 228.

Mounted on the end of the shaft 228 adjacent the bearing 229 is a bevel gear 243 which is meshed with the bevel gear 34 on the shaft 33, whereby the gear box 218 is operatively connected to the shaft 33 to actuate the dough transporting chains 27a and 27b.

The rotary dough distributing drum 73 carried on the shaft 78 is driven by a chain 244 engaged with a driving sprocket 245 rigidly mounted on the shaft 43, and the driven sprocket 79 mounted on the shaft 78. Thus, the drum 73 is driven through the chains 27a and 27b, which transmits power from the shaft 33 to the shaft 43.

The gate structure 108 is also actuated from the shaft 228, the latter having a cam 246 rigidly mounted thereon, adapted to be engaged by a cam roller 247 rotatably mounted on the lower end of a lever 248, the latter being pivotally carried intermediate its ends by a stud 249 mounted on an extension plate 251 secured to the rear, intermediate upright 26 by welding, or other suitable means. Pivotally connected to the upper end of the lever 248 is the free end of the link 129, such end of the latter being adjustably connected to the lever 248 by an L-shaped connecting member 252 which, for example, may be threaded on the end of the link 129, and locked in position by a lock nut 253. Referring to Fig. 11, it will be apparent that as the cam 246 is rotated, the lever 248 will be partially rotated back and forth to periodically reciprocate the link 129, thus opening and closing the gates 125. Obviously, the shape of the cam 246 will be dependent upon the relative speed of the shaft 228, the speed of the conveyor chains 27a and 27b, and the number of lumps of dough simultaneously deposited in the pans.

The driving shaft 163 for the tray conveyor chains 135a and 135b is also driven from the counter-shaft 225 by means of a chain 254 engaged with a sprocket 255 rigidly secured to the countershaft 225, and a driven sprocket 256 carried by the shaft 163. The sprocket 256 is operatively connected to the shaft 163 by a safety clutch 257, shown in dotted lines in Fig. 1, and constructed in the same manner as the safety clutch associated with the sprocket 235, whereby increased resistance on the tray conveyor chains 135a and 135b will result in operative disengagement of the sprocket 256 from the shaft 163.

The belt conveyor is actuated by a chain 258 engaged with a driving sprocket 259 rigidly conected to the forward end of the intermediate shaft 228, and engaged with a driven sprocket 261 on a counter-shaft 262 carried by the same brackets that carry the shaft 208 The shaft 262 is operatively connected to the shaft 208 by a pinion 263 which is meshed with the pinion 209 carried by the shaft 208. The use of the counter-shaft 261 results in the shaft 208 being rotated counter-clockwise, as viewed in Fig. 1, to move the upper portion of the conveyor belt 212 in a left hand direction, as viewed in Fig. 2, whereby trays deposited on the belt will be carried away from the machine.

To insure that the lumps of dough are covered with sufficient flour to prevent sticking of such lumps to various portions of the machine prior to the loading of the dough into the pans, a power actuated flour sifter is also provided. This structure is illustrated in Figs. 2 and 3, and comprises a flour container or receptacle 264 carried by a laterally extending frame member 265 secured by a suitable bracket 266 to the front, intermediate upright 26 adjacent the upper end of the latter, the frame member 265 being reinforced by a downwardly extending brace 267 secured at its lower end to the flange 48 of the adjacent plate 45. The flour container 264 is open at its top, and is provided with an opening in the bottom thereof adjacent the front end 268, and positioned below the opening is a flour directing chute 269. The discharge opening in the bottom of the container may be covered by a suitable, relatively fine mesh screen, and suitable agitating means is employed to insure a flow of flour through the opening into the chute 269. In the embodiment illustrated, the agitating means (not shown) is actuated by a longitudinally extending rock shaft 271, which is partially rotated back and forth by means of an arm 272 rigidly secured to the shaft 271, and connected at its free end by a link 273 to a rock arm 274 rigidly connected to an actuating shaft 275, the latter being journaled in a rear bearing 276 mounted on the frame structure, and a bracket 277 carried by the frame member 265. As illustrated in Fig. 2, the shaft 275 is operatively connected to the driving shaft 219 of the gear box 218 by a rock arm 278 rigidly connected to the shaft 275, and an eccentric 279 mounted on the free end of the driving shaft 219, with the free end of the rock arm 278 being connected to the eccentric 279 by a connecting rod 281. The connections between the rock arm 274 and link 273, and between the rock arm 278 and the connecting rod 281 are adjustable, as clearly shown in Fig. 2, whereby the amount of rocking of the shaft 271 may be readily increased or decreased.

Also extending downwardly from the frame member 265 is a rod 282 terminating at its lower end in a laterally extending portion 283, shown in dotted lines in Fig. 2. Secured to the transverse portion 283, and extending downwardly therefrom are a plurality of chains 284, or other suitable means, the latter being of a length to extend across the path of dough being fed into the machine, whereby they will engage the dough and tend to slightly retard the dough lumps, preventing the lumps from piling up on the drum, as well as to knock off any excess flour deposited on the dough from the flour container 264.

*The operation of the machine*

In the operation of the machine, lumps or balls of dough are fed into the upper end of the chute 72 by suitable means, as for example, dough dividing machines of the type now in use, in which case the dough dividing machine would be set up for operation adjacent the chute 72, and the output from such machine fed directly into the chute, whereby lumps of dough are fed at substantially a uniform rate into the loading machine. As the dough enters the chute, flour from the container 264 is sifted down on the dough, any excess flour being removed by the chains 284 as each lump of dough is deposited in one of the recesses or cups in the drum 73. As the drum 73 is rotating in a clockwise direction, as viewed in Fig. 3, or counter-clockwise direction, as viewed in Fig. 5, the dough will be transported by the drum to adjacent a carrier 52 which is moving upwardly toward the sprockets 31a and 31b, with the fingers 58 of the carrier extending between the discs 91, 92 and 93 of the drum 73. Thus as the operation continues, the fingers will pick up the dough from the drum 73, and transport the same upwardly, and then laterally to the gate structure 108. As the pins 63 of a series of four of the carriers 52 reach the end of their respective offsets 107 in the plate 103, with the lead pin simultaneously reaching the end of the plate, the four pins will simultaneously be disengaged from the plate 103, permitting the doors 61 to drop into a vertical position, such as that illustrated in Fig. 8, whereby the lumps of dough carried on the doors will be dropped into the respective dough compartments of the gate structure 108. As previously mentioned, the plate 103 may be readily adjusted to insure opening of the doors at the proper time.

Simultaneously with the operation thus far described, trays are consecutively placed on the platform formed by the floor 12 at the top of the machine where such trays are picked up by the chain conveyor, the projections 157 engaging the edge or lip of the trays, carrying the same to the right, as viewed in Fig. 1, where the trays are successively dropped to the lower level formed by the floor 9, the dropping action of the trays being synchronized with the action of the conveyor chains 135a and 135b, and projections 157 carried by the bars 154, by action of the movable section 191, the lower end of the trays, as illustrated in dotted lines in Fig. 1, dropping to the floor 9 and normally sliding to the right where they are subsequently stopped by the stop member 197, immediately prior to which the left hand end of the tray has cleared the lower edge of the movable section 191, whereby the trays come to rest in a horizontal position on the floor 9 between a pair of adjacent bars 154, where it is subsequently engaged by one of the bars and projections 157 thereon to transport the tray along the floor 9, to the left as viewed in Fig. 1, underneath the gate structure 108. As the tray passes beneath the gate structure, the gates 125 are opened to drop the lumps of dough deposited therein onto the tray which, as illustrated in Fig. 11, normally is provided with recesses or depressions in the bottom of the tray of a size to receive the lumps of dough and retain the same therein. As the tray progresses at a more or less uniform rate beneath the gate structure, lumps of dough are being intermittently dropped into the compartments of the gate structure, and subsequently released therefrom at the proper time to successively fill each transverse row of the pan. Immediately upon the filling of the last row in a pan, the cam 176 will actuate the driving mechanism for the chains 135a and 135b to impart an additional movement to the chains, and thus to the trays, whereby the first row in the succeeding pan will be properly positioned below the gate structure to receive the lumps of dough therefrom, it being remembered that the chains 27a and 27b, and the gates 125 are being operated at a uniform rate, whereby the lumps of dough are deposited from the carrier 52 into the gate structure, and from the latter to the pans at substantially uniform time intervals, with the tray advancing means speeding up to move the trays the added distance between the last row of one pan, and the first row of the succeeding pans.

By the time the bars 154 reach the sprockets 137, the major portion of the tray area has engaged the belt 212, which thus picks up the tray and transports it away from the machine, where it is manually picked up and deposited on a movable rack or truck, or other suitable means, for transportation to the proofing rooms, and subsequently to the ovens.

As the doors 61 drop to a vertical position, thereby dropping the dough carried thereby into the gate structure 108, each of the pins 63 will engage its respective spring clip 65 on the lower portion of the extension 59 on each carrier 52, thus frictionally retaining the door 61 in its lower or dropped position. The open doors on the carriers 52 will remain in such position as the carriers pass around the sprockets 29a and 29b, and 28a and 28b until the carriers reach the sprockets 32a and 32b, at which point the pins 63 will successively engage the rotating disc 96, disengaging the pins from their respective spring clips 65, and camming the doors into their closed position, illustrated in Fig. 3. The doors are then retained in such position by the plate 98 as they move upwardly around the sprockets 31a and 31b to the release plate 103, from which they are subsequently disengaged to open the doors and drop the lumps of dough into the gate structure.

It will be apparent from the above disclosure that, as the embodiment of the invention illustrated is designed to fill trays having four lumps of dough in each transverse row, the various cams and gearing are designed to maintain proper synchronization of the various operating elements of the device, and in the event the machine is intended for use with trays carrying a different number of lumps of dough, the various actuating cams and driving means may be readily designed to accommodate the same. In this connection, as the gate structure 108 is readily removable from the machine where required, a modified structure can be substituted therefor to accommodate the number of lumps of dough to be disposed in each row on the trays. Likewise, as disclosed at various points in the drawings, suitable lubrication means may be provided at all required points.

It will be apparent from the above description that I have provided a novel tray and pan loading device whereby lumps of dough may be automatically deposited on pans or trays, which machine is designed for high efficiency and durability, readily maintained in a state of cleanliness, and which may be readily operated by two persons—one loading trays onto the machine and checking the operation thereof, and a second person removing the loaded trays as they come from the machine.

In some cases, where practical to operate the machine at a reduced speed, operation can be achieved with merely one man loading the empty pans into the machine as well as removing the filled pans from the machine, this being possible to a large extent by the use of the upper loading platform which is so positioned that both it, and the discharge end of the machine, are readily accessible to one man, who is also in a position to visually inspect the operation of the machine while handling the pans.

It will also be noted that I have provided novel means for transporting the dough and depositing it in the pans, as well as novel means for transporting the pans, including means for periodically moving the pans at a greater rate to compensate for the difference in dimensions between rows on adjoining pans.

Having thus described my invention, it is obvious that various immaterial modifications may be made in the same without departing from the spirit of my invention; hence, I do not wish to be understood as limiting myself to the exact form, construction, arrangement, and combination of parts herein shown and described, or uses mentioned.

What I claim as new and desire to secure by Letters Patent is:

1. In a variable speed mechanism, the combination of a driving sprocket and a driven sprocket, an endless chain connecting said sprockets, said chain being of a length to produce an excess amount of slack therein, a pair of idler sprockets each engaging a respective intermediate portion of the chain between the driving and driven sprockets, means for supporting the respective idler sprockets for movement toward and away from the line of centers of the driving and driven sprockets, means for urging the respective idler sprockets toward such line of centers whereby each idler sprocket tends to take up the slack in said chain, and means associated with one of said idler sprockets for intermittently moving the same away from said line of centers whereby the bulk of the slack in said chain is alternately taken up by the respective idler sprockets, thereby imparting a variable speed to the driven sprocket.

2. In a variable speed mechanism, the combination of a rotary driving member and a rotary driven member, an endless element connecting said member, said element being of a length to produce an excess amount of slack therein, a pair of rotatable idler members each engaging a respective intermediate portion of the endless element between the driving and driven members, means for supporting the respective idler members for movement toward and away from the line of centers of the driving and driven members, means for urging the respective idler members toward such line of centers whereby each idler member tends to take up the slack in said endless element, and means associated with one of said idler members for intermittently moving the same away from said line of centers whereby the bulk of the slack in said endless element is alternately taken up by the respective idler members, thereby imparting a variable speed to the driven member.

3. In a variable speed mechanism, the combination of a driving sprocket and a driven sprocket, an endless chain connecting said sprockets, said chain being of a length to produce an excess amount of slack therein, a pair of arms pivotally mounted on respective axes fixed relative to the axes of said sprockets, a pair of idler sprockets each rotatably mounted on a respective arm and engaging a respective intermediate portion of the chain between the driving and driven sprockets, said arms being movable to carry said idler sprockets toward and away from the line of centers of the driving and driven sprockets, a relatively weak tension spring operatively related to the idler sprocket engaging the intermediate portion of the chain moving from the driving to the driven sprocket toward such line of centers whereby such idler sprocket tends to take up the slack in said chain, a relatively strong tension spring operatively related to the other of said idler sprockets operative to urge the latter toward such line of centers whereby such idler sprocket tends to take up the slack in said chain, and a rotatable cam operatively related to the supporting arm of the last-mentioned idler sprocket for intermittently moving the latter away from said line of centers whereby the slack in said chain is taken up by the first-mentioned idler sprocket under action of the relatively weak spring associated therewith and subsequently taken up by the second idler sprocket under the action of the relatively strong spring associated therewith, thereby imparting a variable speed to the driven sprocket.

4. In a variable speed mechanism, the combination of a rotary driving member and a rotary driven member, an endless element connecting said member, said element being of a length to produce an excess amount of slack therein, a pair of rotatable idler members each engaging a respective intermediate portion of the endless element between the driving and driven members, means for supporting the respective idler members for movement toward and away from the line of centers of the driving and driven members, relatively weak means operatively related to the idler member engaging the intermediate portion of the endless element moving from the driving to the driven member toward such line of centers whereby such idler member tends to take up the slack in said element, relatively strong means operatively related to the other of said idler members operative to urge the latter toward such line of centers whereby such idler member tends to take up the slack in said element, and means operatively related to the last-mentioned idler member for intermittently moving the latter away from said line of centers whereby the slack in said element is taken up by the first-mentioned idler member under action of the relatively weak means associated therewith and subsequently taken up by the second idler member under the action of the relatively strong means associated therewith, thereby imparting a variable speed to the driven member.

5. In a dough panning machine, the combination of conveying means for continuously moving a plurality of dough receiving pans along a predetermined substantially horizontal line of travel, conveying means comprising dough carrying members including pivoted doors therefor for receiving and continuously transporting a plurality of series of lumps of dough above and transversely across the line of travel of said pans, gate means positioned between said line of travel and said dough transporting means, said gate means including an inclined bottom plate provided with compartments for intermittently receiving successive series of lumps of dough and also including a plurality of gates for the respective compartments for discharging each respective series of lumps of dough therefrom in a pan therebelow at predetermined time intervals, and means for continuously feeding lumps of dough into said transporting means.

6. In a dough panning machine, the combination of conveying means for moving a plurality of dough receiving pans along a predetermined line of travel, conveying means comprising dough carrying members including pivoted doors therefor for receiving and transporting a plurality of series of lumps of dough above and transversely across the line of travel of said pans, gate means positioned between said line of travel and said dough transporting means, said gate means including an inclined bottom plate comprising compartments for receiving successive series of lumps of dough and also including a plurality of gates for the respective compartments for discharging each respective series of lumps of dough therefrom in a pan therebelow, and means for feeding lumps of dough into said transporting means.

7. In a dough panning machine, the combination of conveying means for continuously moving a plurality of dough receiving pans along a predetermined line of travel, conveying means comprising dough carrying members including pivoted doors therefor for transporting a plurality of series of lumps of dough above and transversely across the line of travel of said pans, and gate means operatively positioned below the dough carrying members for discharging each respective series therefrom of lumps of dough in the pan therebelow at relatively uniform predetermined time intervals, and driving means for said pan-moving means for intermittently moving said pans a greater distance during certain of said time intervals than during other of such intervals.

8. In a dough panning machine, the combination of conveying means for continuously moving a plurality of dough receiving pans along a predetermined substantially horizontal line of travel, a chain conveyor mechanism, a portion of which is movable transversely across and above the line of travel of said pans, a plurality of dough receiving carriers carried by said chain of conveyor mechanism, each of the dough receiving carriers including a pivoted door, gate means including an inclined bottom plate comprising compartments positioned between said line of travel and said chain conveyor mechanism for intermittently receiving successive series of lumps of dough from a plurality of said carriers and discharging each respective series of lumps of dough therefrom in the pan therebelow at predetermined time intervals, and means for continuously feeding lumps of dough into said transporting means.

9. In a dough panning machine, the combination of conveying means for moving a plurality of dough receiving pans along a predetermined line of travel, transporting means including a plurality of dough receiving carriers, each of said carriers including a pivoted and gravity actuated door therefor for receiving and transporting a plurality of series of lumps of dough relative to such line of travel of said pans, gate means for intermittently receiving successive series of lumps of dough from said transporting means upon pivoting successive doors and discharging each respective series into a pan in said line of travel, and means for feeding lumps of dough into said transporting means.

10. In a dough panning machine, the combination of a pair of pan supporting surfaces, one of which is positioned above the other, a pair of spaced, endless, pan conveyor chains positioned in respective substantially vertical, parallel planes, each adjacent a respective side of said pan supporting surfaces, an upper portion of each chain being positioned adjacent said upper surface and the lower portion of each chain being positioned adjacent the lower surface, means connecting said chains at spaced intervals for engaging pans on the respective surfaces and moving the same therealong, with the pans on one surface moving in the opposite direction relative to the pans moving on the other surface, a movable member related to the upper surface movable to permit a pan moving along the upper surface to drop to the lower surface, a second pair of spaced endless chains positioned in respective parallel planes extending at right angles to the planes of the pan conveyor chains, with the upper portions of said second chains extending between the upper and lower portions of the pan conveyor chains, a plurality of dough carriers supported by and movable with said second pair of chains, said dough carriers each comprising a plurality of outwardly extending spaced fingers and a movable dough supporting member, each of said dough supporting members being movable from a dough supporting position to a dough releasing position, a rotary dough receiving drum structure positioned adjacent an end portion of said second chain and provided with a plurality of spaced peripheral dough receiving recesses therein, said drum having a plurality of radially extending annular grooves therein between which the fingers on said dough carriers may successively pass to remove dough from said recesses, a plurality of dough receiving receptacles positioned between said lower surface and the upper portions of said second pair of chains, means for actuating said dough supporting members to a dough releasing position when above said receptacles, each of the latter having a movable gate, movable from a position to retain the dough in such receptacles to a position to release dough therefrom into a pan positioned on said lower surface, and power driven means for actuating said pan conveying chains, drum, gates, and said movable member adjacent said upper surface in a predetermined cycle of operation, whereby pans placed on said upper surface will move to the lower surface and be filled with lumps of dough as they pass below said receptacles, said pan conveyor chains being operatively connected to said power means by a driving sprocket associated with said means and a driven sprocket operatively related to said pan conveyor chains, an endless chain connecting said sprockets, said chain being of a length to produce an excess amount of slack therein, a pair of idler sprockets each engaging a respective intermediate portion of the chain between the driving and driven sprocket, means for supporting the respective idler sprockets for movement toward and away from the line of centers of the driving and driven sprockets, means for urging the respective idler sprockets toward such line of centers whereby each idler sprocket tends to take up the slack in said chain, and means associated with one of said idler sprockets for intermittently moving the same away from said line of centers whereby the slack in said chain is alternately taken up by the respective idler sprockets, thereby intermittently increasing the travel of said pan conveyor chains as an empty pan is moved into loading position beneath said receptacles.

11. In a dough panning machine, the combination of a pair of pan supporting surfaces, one of which is positioned above the other, a pair of spaced, endless, pan conveyor chains positioned in respective substantially vertical, parallel planes, each adjacent a respective side of said pan supporting surfaces, an upper portion of each chain being positioned adjacent said upper surface and the lower portion of each chain being positioned adjacent the lower surface, means connecting said chains at spaced intervals for engaging pans on the respective surfaces and moving the same therealong, with the pans on one surface moving in the opposite direction relative to the pans moving on the other surface, a movable member related to the upper surface movable to permit a pan moving along the upper surface to drop to the lower surface, a second pair of spaced endless chains positioned in respective parallel planes extending at right angles to the planes of the pan conveyor chains, with the upper portions of said second chains extending between the upper and lower portions of the pan conveyor chains, a plurality of dough carriers supported by and movable with said second pair of chains, said dough carriers each comprising a plurality of outwardly extending spaced fingers and a movable dough supporting member, each of said dough supporting members being movable from a dough supporting position to a dough releasing position, a rotary dough receiving drum structure positioned adjacent an end portion of said second chains and provided with a plurality of spaced peripheral dough receiving recesses therein, said drum having a plurality of radially extending annular grooves therein between which the fingers on said dough carriers may successively pass to remove dough from said recesses, a plurality of dough receiving receptacles positioned between said lower surface and the upper portions of said second pair of chains, means for actuating said dough supporting members to a dough releasing position when above said receptacles, each of the latter having a movable gate, movable from a position to retain the dough in such receptacles to a position to release dough therefrom into a pan positioned on said lower surface, and power driven means for actuating said chains, drum, gates, and said movable member adjacent said upper surface, whereby pans placed on said upper surface will move to the lower surface and be filled with lumps of dough as they pass below said receptacles, and means associated with said pan moving chains for increasing the travel thereof as an empty pan is moved into loading position beneath said receptacles.

12. In a dough panning machine, the combination of a pair of pan supporting surfaces, one of which is positioned above the other, a pair of spaced endless pan conveyor chains positioned in respective substantially vertical parallel planes, each adjacent a respective side of said pan supporting surfaces, an upper portion of each chain being positioned adjacent said upper surface and the lower portion of each chain being positioned adjacent the lower surface, means connecting said chains at spaced intervals for engaging pans on the respective surfaces and moving the same therealong, with the pans on one surface moving in the opposite direction relative to the pans moving on the other surface, a movable member related to the upper surface movable to permit a pan moving along the upper surface to drop to the lower surface, a driven sprocket operatively associated with said driving chains for actuating the same, a driving sprocket operatively connected to a source of power, an endless chain connecting said sprockets, said chain being of a length to produce an excess amount of slack therein, a pair of idler sprockets each engaging a respective intermediate portion of the chain between the driving and driven sprocket, means for supporting the respective idler sprockets for movement toward and away from the line of centers of the driving and driven sprockets, means for urging the respective idler sprockets toward such line of centers whereby each idler sprocket tends to take up the slack in said chain, and means associated with one of said idler sprockets for intermittently moving the same away from said line of centers whereby the slack in said chain is alternately taken up by the respective idler sprockets, thereby imparting a variable speed to the driven sprocket and said pan conveyor chains.

13. In a dough panning machine for transferring lumps of dough and delivering successive series of lumps of dough on successive pans, the combination of a pair of pan supporting surfaces, one of which is positioned above the other, the upper pan supporting surface to receive empty pans for discharge to the lower pan supporting surface a pair of spaced endless pan conveyor chains positioned in respective substantially vertical parallel planes, each adjacent a respective side of said pan supporting surfaces, an upper portion of each chain being positioned adjacent said upper surface and the lower portion of each chain being positioned adjacent the lower surface, means connecting said chains at spaced intervals for engaging pans on the respective surfaces and moving the same therealong, with the empty pans on the upper surface moving in the opposite direction relative to the pans moving on the lower surface to receive the successive series of lumps of dough, a movable member related to the upper surface movable to permit a pan moving along the upper surface to successively drop to the lower surface in timed relationship, and conveying means operatively mounted substantially transverse to the direction of movement of the pans for loading said pans with successive series of lumps of dough upon the pans upon the lower surface as the pans move successively along said lower surface.

14. In a dough panning machine, the combination of a pair of pan supporting surfaces, one of which is positioned above the other, a pair of spaced endless pan conveyor chains positioned in respective substantially vertical parallel planes, each adjacent a respective side of said pan supporting surfaces, an upper portion of each chain being positioned adjacent said upper surface and the lower portion of each chain being positioned adjacent the lower surface, means connecting said chains at spaced intervals for engaging pans on the respective surfaces and moving the same therealong, with the pans on one surface moving in the opposite direction relative to the pans moving on the other surface, a movable member related to the upper surface movable to permit a pan moving along the upper surface to drop to the lower surface, means for receiving and continuously transporting a plurality of series of lumps of dough above and transversely across the line of travel of said pans, and means positioned between said line of travel and said dough transporting means for intermittently receiving successive series of lumps of dough and discharging each respective series therefrom in a pan therebelow at predetermined time intervals.

15. In a dough panning machine, the combination of means for moving a plurality of dough receiving pans along a predetermined line of travel, a pair of spaced endless chains positioned in respective parallel planes extending transversely to the line of travel of such pans with the upper portions of said chains thereacross, a plurality of dough carriers supported by and movable with said pair of chains, said dough carriers each comprising a plurality of outwardly extending spaced fingers and a movable dough supporting member, each of said dough supporting members being movable from a dough supporting position to a dough releasing position, a rotary dough receiving drum structure positioned adjacent an end portion of said chains and provided with a plurality of spaced peripheral dough receiving recesses therein, said drum having a plurality of radially extending annular grooves therein between which the fingers on said dough carriers may successively pass to remove dough from said recesses, a plurality of dough receiving receptacles positioned between said line of travel and the upper portions of said pair of chains, means for actuating said dough supporting members to a dough releasing position when above said receptacles, each of the latter having a movable gate, movable from a position to retain the dough in such receptacles to a position to release dough therefrom into a pan positioned therebelow, and power driven means for actuating said chains, said drum, and said gates whereby pans will be filled with lumps of dough as they pass below said receptacles into loading position.

16. In a dough panning machine, the combination of pan positioning means for moving a plurality of dough receiving pans along a predetermined line of travel, a pair of spaced endless chains positioned in respective parallel planes extending transversely to the line of travel of such pans with the upper portions of said chains thereacross, a plurality of dough carriers supported by and movable with said pair of chains, said dough carriers each including a movable dough supporting member, each of said dough supporting members being movable from a dough supporting position to a dough releasing position, disk means operatively connected to said pair of chains for moving the dough supporting members from a dough releasing position to a dough supporting position, a plurality of dough receiving receptacles positioned between said line of travel and the upper portions of said pair of chains, drum means for delivering successive lumps of dough to the dough carriers, drive means operatively connecting the disk means and drum means together for discharging the lumps of dough from the drum means to the dough carriers, means for actuating said dough supporting members to a dough releasing position when above said receptacles, each of the latter having a movable gate, movable from a position to retain the dough in such receptacles to a position to release dough therefrom into a pan positioned therebelow, and power driven means for actuating said chains, said drum means, and said gates whereby pans will be filled with lumps of dough as they pass below said receptacles into loading position.

17. In a dough panning machine, the combination of a pair of pan supporting surfaces, one of which is positioned above the other, a pair of spaced, endless, pan conveyor chains positioned in respective substantially vertical, parallel planes, each adjacent a respective side of said pan supporting surfaces, an upper portion of each chain being positioned adjacent said upper surface and the lower portion of each chain being positioned adjacent the lower surface, means connecting said chains at spaced intervals for engaging pans on the respective surfaces and moving the same therealong, with the pans on one surface moving in the opposite direction relative to the pans moving on the other surface, a movable member related to the upper surface movable to permit a pan moving along the upper surface to drop to the lower surface, a second pair of spaced endless chains positioned in respective parallel planes extending at right angles to the planes of the pan conveyor chains, with the upper portions of said second chains extending between the upper and lower portions of the pan conveyor chains, a plurality of dough carriers supported by and movable with said second pair of chains, said dough carriers each including a plurality of movable dough supporting members, each of said dough supporting members being movable from a dough supporting position to a dough releasing position, means for feeding lumps of dough into respective carriers, a plurality of dough receiving receptacles positioned between said lower surface and the upper portions of said second pair of chains, means for actuating said dough supporting members to a dough releasing position when above said receptacles, each of the latter having a movable gate, movable from a position to retain the dough in such receptacles to a position to release dough therefrom into a pan positioned on said lower surface, and power driven means for actuating said chains, said gates, and said movable member adjacent said upper surface whereby pans placed on said upper surface will move to the lower surface and be filled with lumps of dough as they pass below said receptacles, and means associated with said pan moving chains for increasing the travel thereof as an empty pan is moved into loading position beneath said receptacles.

18. In a dough feeding mechanism, the combination of a pair of substantially co-extensive spaced endless chains positioned in respective parallel planes, a plurality of dough carriers supported by and movable with said pair of chains, said dough carriers each comprising a plurality of outwardly extending spaced fingers and a movable dough supporting member, each of said dough supporting members being movable from a dough supporting position to a dough releasing position, a rotary dough receiving drum structure positioned adjacent an end portion of said chains and provided with a plurality of spaced peripheral dough receiving recesses therein, said drum having a plurality of radially extending annular grooves therein between which the fingers on said dough carriers may successively pass to remove dough from said recesses, a plurality of dough receiving receptacles positioned below the upper portions of said pair of chains, means for actuating said dough supporting members to a dough releasing position when above said receptacles, each of the latter having a movable gate, movable from a position to retain the dough in such receptacles to a position to release dough therefrom, and power driven means for actuating said chains, said drum, and said gates.

19. In a dough feeding mechanism, the combination of a pair of substantially co-extensive spaced endless chains positioned in respective parallel planes, a plurality of dough carriers supported by and movable with said pair of chains, said dough carriers each comprising a plurality of outwardly extending spaced fingers and a movable dough supporting member, each of said dough supporting members being movable from a dough supporting position to a dough releasing position, a rotary dough receiving drum structure positioned adjacent an end portion of said chains and provided with a plurality of spaced peripheral dough receiving recesses therein, said drum having a plurality of radially extending annular grooves therein between which the fingers on said dough carriers may successively pass to remove dough from said recesses, a plurality of dough receiving receptacles positioned below the upper portions of said pair of chains, a projection extending laterally outward from each dough supporting member, means engaging said projections for actuating said dough supporting members to a dough releasing position when above said receptacles, each of the latter having a movable gate, movable from a position to retain the dough in such receptacles to a position to release dough therefrom, and power driven means for actuating said chains, said drum, and said gates.

20. In a dough panning machine for transferring lumps of dough and delivering successive series of lumps of dough on successive pans, the combination of pan moving means for continuously moving a plurality of dough receiving pans along a predetermined line of travel, conveying means for transporting a plurality of series of lumps of dough above and transversely across the line of travel of said pans, and discharging each respective series therefrom in the pan therebelow at relatively uniform predetermined time intervals, and variable speed mechanism for said pan moving means for intermittently moving said pans at a variable speed during certain of said time intervals than during other of such intervals.

21. In a dough panning machine for transferring lumps of dough and delivering successive series of lumps of dough on successive pans, the combination of pan moving means for continuously moving a plurality of dough receiving pans along a predetermined line of travel, conveying means for transporting a plurality of series of lumps of dough above and transversely across the line of travel of said pans, and discharging each respective series therefrom in the pan therebelow at relatively uniform predetermined time intervals, and variable speed mechanism for said pan moving means for moving said pans at a predetermined uniform rate of speed during the cycle of the discharge of the series of lumps of dough into a pan and at an increased rate of speed to bring a successively empty pan into position prior to the discharge of a series of lumps of dough thereto, and thereafter returning to the original rate of speed of the pans as the cycle of the discharge of the series of lumps of dough to the successive pan is being completed.

22. In a dough feeding mechanism, the combination of a pair of substantially coextensive spaced endless chains positioned in respective parallel planes, a plurality of dough carriers supported by and movable with said pair of chains, said dough carriers each comprising a plurality of outwardly extending spaced fingers and a movable dough supporting member, each of said dough supporting members being movable from a dough supporting position to a dough receiving position, a rotary dough receiving drum structure positioned adjacent an end portion of said chains and provided with a plurality of spaced peripheral dough receiving recesses therein, said drum having a plurality of radially extending annular grooves therein between which the fingers on said dough carriers may successively pass to remove dough from said recesses, a plurality of dough receiving receptacles positioned below the upper portions of said pair of chains, and means for actuating said dough supporting members to a dough releasing position when above said receptacles.

23. In a dough feeding mechanism, the combination of a pair of substantially coextensive spaced endless chains positioned in respective parallel planes, a plurality of dough carriers supported by and movable with said pair of chains, said dough carriers each comprising a plurality of outwardly extending spaced fingers and a movable dough supporting member, each of said dough supporting members being movable from a dough supporting position to a dough receiving position, a rotary dough receiving drum structure positioned adjacent an end portion of said chains and provided with a plurality of spaced peripheral dough receiving recesses therein, said drum having a plurality of radially extending annular grooves therein between which the fingers on said dough carriers may successively pass to remove dough from said recesses, a plurality of dough receiving receptacles positioned below the upper portions of said pair of chains, means for actuating said dough supporting members to a dough releasing position when above said receptacles, and power driven means for actuating said chains and said drum.

24. In a dough feeding mechanism, the combination of conveying means, a plurality of dough carriers including movable dough supporting members and supported by and movable with said conveying means, dough receiving means positioned adjacent an end portion of said conveying means and adapted to discharge dough therefrom to the conveying means, a plurality of dough receiving receptacles positioned to receive dough discharged from the movable dough supporting members of said dough carriers, and means cooperable with said movable dough supporting members for effecting movement thereof to discharge dough from the movable dough supporting members of said dough carriers when above said receptacles.

25. In combination with a dough divider, a conveying means comprising a pair of substantially coextensive spaced endless chains positioned in respective parallel planes, a plurality of dough carriers supported by and movable with each pair of chains, said dough carriers each having a movable dough supporting member, each of said dough supporting members being movable from a dough supporting position to a dough releasing position, dough receiving means comprising conveying means and a dough supporting tray operatively mounted thereon, said dough receiving means positioned to pass beneath one of said runs of said conveying means at right angles thereto, projections extending outwardly from each movable dough supporting member on said conveying means, means engaging said projections for actuating said dough supporting members to a dough releasing position when above the dough supporting tray of said dough receiving means, and unitary drive means operating said conveyor means and said dough receiving means in timed relation.

26. In a roll panning machine, the combination of a frame, means thereon for conveying rolls from a supply station to a panning station and automatically successively discharging groups of said rolls at said panning station, and means for conveying pans to said panning station in timed relation to the discharge of said groups of rolls to receive the rolls as they are discharged, the first-mentioned means comprising an endless conveyor having tiltably mounted means thereon for each roll in a group tiltable about an axis perpendicular to the direction of travel of said conveyor to gravitationally discharge the roll, said tiltably mounted means being spaced apart longitudinally of the conveyor and mechanism normally holding said tiltably mounted means against tilting and for causing a plurality of said tiltably mounted means to tilt simultaneously including a track along which moves a portion of each tiltably mounted means for holding the tiltably mounted means against tilting, said track and said tiltably mounted means complementally formed permitting disengagement of all tiltably mounted means of a group simultaneously to provide for tilting of said tiltably mounted means for discharging the rolls therefrom.

27. In a roll panning machine, the combination of a frame, means thereon for conveying rolls from a supply station to a panning station and automatically successively discharging groups of said rolls at said panning station, and means for conveying pans to said panning station in timed relation to the discharge of said groups of rolls to receive the rolls as they are discharged, the first-mentioned means comprising an endless conveyor having tiltably mounted means thereon for each roll in a group tiltable to gravitationally discharge the roll, and mechanism normally holding said tiltably mounted means against tilting and for causing a plurality of said tiltably mounted means to tilt simultaneously, including a track along which moves a portion of each tiltably mounted means for holding the tiltably mounted means against tilting, said track having a trip section for disengagement with all tiltably mounted means of a group simultaneously to provide for tilting of said tiltably mounted means to discharge the rolls therefrom.

28. In a roll panning machine, the combination of a frame, means thereon for conveying rolls from a supply station to a panning station and automatically successively discharging groups of said rolls at said panning station, and means for conveying pans to said panning station in timed relation to the discharge of said groups of rolls to receive the rolls as they are discharged, the first-mentioned means comprising an endless conveyor having a tiltably mounted means thereon for each roll in a group tiltable about an axis perpendicular to the direction of travel of said conveyor to gravitationally discharge the roll, said tiltably mounted means being spaced apart in the direction of movement of said conveyor, and means for holding said tiltably mounted means normally against tilting while they are moved from the supply station into said panning station including means at said panning station common to all of a plurality of tiltably mounted means at the panning station for releasing all of said plurality of tiltably mounted means simultaneously for tilting.

References Cited in the file of this patent

UNITED STATES PATENTS

| Number | Name | Date |
|---|---|---|
| Re. 21,288 | Novotny | Dec. 5, 1939 |
| 1,090,855 | Jagenberg | Mar. 24, 1914 |
| 1,312,640 | Mallinckrodt | Aug. 12, 1919 |
| 1,853,392 | Zesbaugh | Apr. 12, 1932 |
| 1,869,457 | Benoit | Aug. 2, 1932 |
| 1,927,461 | Lindgren | Sept. 19, 1933 |
| 2,301,543 | Hlavatny | Nov. 10, 1942 |
| 2,331,018 | Fedorchak et al. | Oct. 5, 1943 |
| 2,400,484 | Campana | May 21, 1946 |
| 2,437,950 | Gaddini | Mar. 16, 1948 |
| 2,670,888 | Avila | Mar. 2, 1954 |
| 2,704,177 | Neaves | Mar. 15, 1955 |